United States Patent
Godowski et al.

(10) Patent No.: US 11,556,655 B2
(45) Date of Patent: Jan. 17, 2023

(54) AUTOMATIC VULNERABILITY MITIGATION

(71) Applicant: International Business Machines Corporation, Armonk, NY (US)

(72) Inventors: Piotr P. Godowski, Cracow (PL); Szymon Kowalczyk, Cracow (PL); Michal Paluch, Cracow (PL); Tomasz Hanusiak, Cracow (PL); Andrzej Pietrzak, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 17/158,180

(22) Filed: Jan. 26, 2021

(65) Prior Publication Data

US 2022/0237301 A1     Jul. 28, 2022

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| G06F 21/57 | (2013.01) |
| G06F 21/54 | (2013.01) |
| G06F 21/53 | (2013.01) |

(52) U.S. Cl.
CPC ............ G06F 21/577 (2013.01); G06F 21/53 (2013.01); G06F 21/54 (2013.01); *G06F 2221/033* (2013.01)

(58) Field of Classification Search
CPC ........ G06F 21/577; G06F 21/53; G06F 21/54; G06F 2221/033
See application file for complete search history.

(56) References Cited

U.S. PATENT DOCUMENTS

| | | | |
|---|---|---|---|
| 10,719,612 B2 | 7/2020 | Stopel et al. | |
| 2017/0068676 A1* | 3/2017 | Jayachandran | ....... G06F 16/125 |
| 2017/0098072 A1 | 4/2017 | Stopel et al. | |
| 2017/0109536 A1* | 4/2017 | Stopel | .................. G06F 21/577 |
| 2017/0180346 A1 | 6/2017 | Suarez et al. | |
| 2019/0332780 A1* | 10/2019 | Cui | .......................... G06F 8/65 |

(Continued)

OTHER PUBLICATIONS

Mell et al., "The NIST Definition of Cloud Computing", Recommendations of the National Institute of Standards and Technology, Special Publication 800-145, Sep. 2011, 7 pages.

(Continued)

*Primary Examiner* — Trong H Nguyen
(74) *Attorney, Agent, or Firm* — James L. Olsen (57) ABSTRACT

An image for a containerized application is created. From the image, one or more main processes of the containerized application are identified. The one or more main processes comprise a first subset of a plurality of processes of the containerized application. Within a sandbox environment, the containerized application is started. Based on the started application within the sandbox environment, a second subset of processes within the plurality is determined. The second subset includes one or more dependent processes associated with the first subset. A third subset of processes within the plurality is determined. The third subset excludes the first and second subsets and is associated with a vulnerability list. According to the third subset, a mitigated image for the containerized application is generated.

14 Claims, 6 Drawing Sheets

(56) References Cited

U.S. PATENT DOCUMENTS

| | | | |
|---|---|---|---|
| 2020/0082095 A1 | 3/2020 | McAllister et al. | |
| 2020/0125731 A1* | 4/2020 | Benameur | G06F 9/45558 |
| 2021/0173935 A1* | 6/2021 | Ramasamy | G06F 21/577 |
| 2021/0312037 A1* | 10/2021 | Revivo | G06F 21/552 |

OTHER PUBLICATIONS

Aqua Cloud native Security, Container Security & Serverless Security, Accessed Sep. 15, 2022, 1 Pg, <https://www.aquasec.com/>.

IBM Cloud Docs, "Managing Image Security with Vulnerability Advisor", Accessed Sep. 15, 2022, 14 Pgs, <https://cloud.ibm.com/docs/va/va_index.html#about>.

Tenzer., RedHat Hybrid Cloud—BLOGk "Security and Vulnerability Scanning of Container Mages", Feb. 21, 2018, 16 Pgs, <https://www.openshift.com/blog/security-vulnerability-scanning-container-images>.

* cited by examiner

AUTOMATIC VULNERABILITY MITIGATION

BACKGROUND

The present disclosure relates generally to the field of vulnerability mitigation, and more particularly to mitigating vulnerabilities in containerized applications.

Virtual machines and hypervisors are commonly employed in cloud computing environments. Containerized applications are easy to deploy in a cloud computing environment and can often be produced multiple times from a source image, which may include a library of processes and commands to be used in support of the application. At times, source images and/or containerized applications may include processes/commands that may be exploitable, or even outright malicious.

SUMMARY

Embodiments of the present disclosure include a method, computer program product, and system for automatic vulnerability mitigation.

An image for a containerized application is created. From the image, one or more main processes of the containerized application are identified. The one or more main processes comprise a first subset of a plurality of processes of the containerized application. Within a sandbox environment, the containerized application is started. Based on the started application within the sandbox environment, a second subset of processes within the plurality is determined. The second subset includes one or more dependent processes associated with the first subset. A third subset of processes within the plurality is determined. The third subset excludes the first and second subsets and is associated with a vulnerability list. According to the third subset, a mitigated image for the containerized application is generated.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of vulnerability mitigation, and more particularly to mitigating vulnerabilities in containerized applications. While the present disclosure is not necessarily limited to such applications, various aspects of the disclosure may be appreciated through a discussion of various examples using this context.

Virtual machines and hypervisors are commonly employed in cloud computing environments. Containerized applications are easy to deploy in a cloud computing environment and can often be produced multiple times from a source image, which may include a library of processes and commands to be used in support of the application. At times, source images and/or containerized applications may include processes/commands that may be exploitable, or even outright malicious. An integral part of providing cloud services includes ensuring deployed applications are secure, and that adding any new applications does not degrade the overall security posture of the cloud computing environment.

Conventional methods for mitigating security vulnerabilities typically include scanning containerized applications and, when a vulnerability is found, stopping and/or preventing the startup of the vulnerable application and/or container. To overcome this issue, the application vendor may need to update and/or remove the vulnerable process and resubmit a request to start the containerized application. This may be a lengthy process including deep analyses of process dependencies and interactions. Further, many reported vulnerabilities include false positives, which causes a large cost in resources and employee hours for virtually no benefit.

Embodiments of the present disclosure may focus on the fact that container images are built from layers, where one layer adds, incrementally, binaries/processes on top of previous layers. Subsequent layers may remove processes and files from previous layers and/or block or halt them from starting or otherwise mitigate their presence and operation.

In some embodiments, a security scanner (e.g., IBM VULNERABILITY ADVISOR, REDHAT VULNERABILITY SCANNER, AQUA CONTAINER SECURITY PLATFORM, etc.) may scan a containerized application and report which binaries/processes include vulnerabilities in a report/list. The report is loaded into, for example, an automated remediation tool which identifies the main process within the container image, identifies dependent processes associated with the main process, and cross-correlates those dependent processes against the vulnerability list. Whenever a vulnerability is found that affects a process which does not depend from the main process, the affected process may be marked for removal or other mitigation.

In some embodiments, removal and/or mitigation commands for mitigating the vulnerability may be incorporated into an additional layer for the container image. In this way, any detected vulnerabilities not affecting the main process may simply be automatically removed/mitigated without the need for an administrator or developer to manually analyze the containerized application. In this way, false positives not affecting the main process or its dependent processes may no longer need to be addressed using human expertise, thus saving time and costs.

An embodiment of the present disclosure may include loading a containerized application from a source image into a runtime environment. A conventional security scanner may be utilized to determine if there are any vulnerabilities present. If no vulnerabilities are present, the containerized application may be left to operate normally. However, if a vulnerability is detected, a list of the vulnerabilities may be compiled and reported. In some embodiments, the containerized application may be first deployed in a sandbox environment, to preserve security.

In response to such a report, the container image may be loaded into a sandbox environment, and the main process for the containerized image may be identified (e.g., using RUN/CMD/ENTRYPOINT statements). After starting the containerized image in the sandbox environment, processes depending from the main process may be discovered using discovery tools, such as LINUX commands "ldd" or "lsof." Additional dependency discovery tools exist in various languages, such as Go, Python, Java, Ruby, Node.js, etc.

Once the vulnerability list is generated and the dependent processes are identified, an embodiment of the present disclosure may compare the two to generate a list of non-dependent processes that match to one or more vulnerabilities. This list of non-dependent, vulnerable processes may include those processes that may be safely removed, blocked, stopped, deleted, or otherwise mitigated without affecting the actions of the main process.

Once this non-dependent, vulnerable process list has been established, the source image may have an additional layer appended to it. This additional layer may be referred to as a "mitigation layer." The mitigation layer may remove the non-dependent, vulnerable processes, delete them using a persistent delete command, block the execution of such processes, or otherwise mitigate the operation and/or presence of the non-dependent, vulnerable processes. The resulting image may be referred to as a mitigated image.

In the runtime environment, the source image may be replaced with the mitigated image. This may be achieved using hot or cold migration techniques, for example. In this way, the bulk of vulnerabilities in containerized applications may be mitigated automatically without any user interference.

Figure 1:
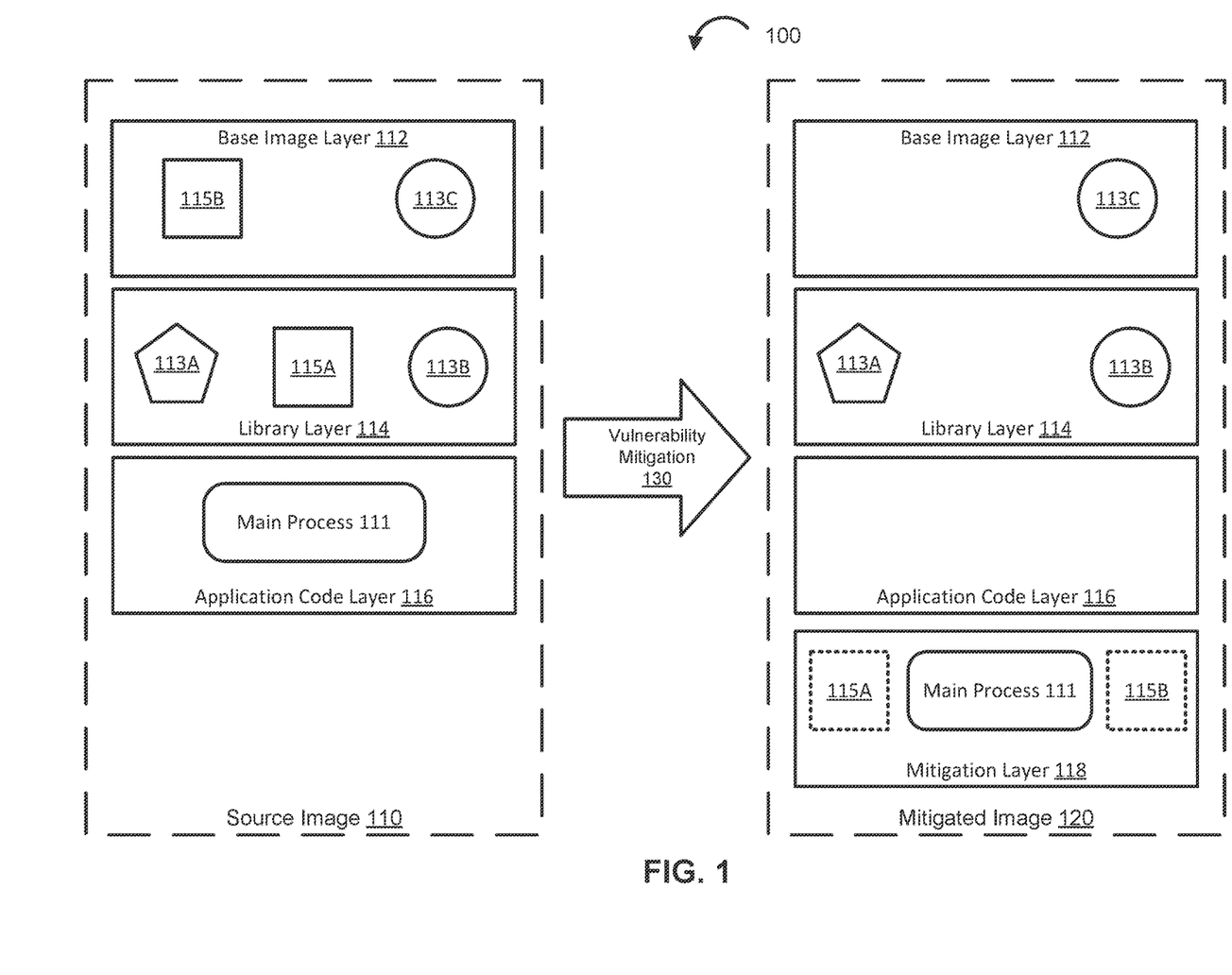
FIG. 1 illustrates an example diagram of containerized application image layers, in accordance with embodiments of the present disclosure.

Referring now to FIG. 1, illustrated is an example diagram 100 of containerized application image layers, in accordance with embodiments of the present disclosure. Diagram 100 illustrates a source image 110, a vulnerability migration process 130, and a mitigated image 120. Vulnerability mitigation 130 may include, for example, the methods described herein for mitigating vulnerabilities in containerized applications. This may include, for example, methods 200/300 and others.

According to embodiments, source image 110 may include an image for a containerized application and may include base image layer 112, library layer 114, and application code layer 116. Base image layer 112 may, according to embodiments, include general processes/files for a containerized application to operate within the particular container platform (e.g., DOCKER, KUBERNETES, etc). Base image layer 112 may include a number of processes, such as process 113C and 115B. In embodiments, base image layer 112 may include any number of processes, and those processes may be critical/necessary, or non-critical to the functioning of the image.

Library layer 114 may include, according to embodiments, the processes/files necessary for a particular container to execute and maintain a desired containerized application (e.g., Operating System processes). In embodiments, library layer 114 may include processes 113A-B and 115A. According to embodiments, library layer 114 may include any number of processes, and those processes may be critical/necessary, or non-critical to the functioning of the image.

Application code layer 116 may include the processes/files of the particular containerized application. In embodiments, application code layer 116 may include a main process 111, which may include the main executed process of the containerized application. According to embodiments, application code layer 116 may include any number of processes, and those processes may be critical/necessary, or non-critical to the functioning of the image.

In embodiments, processes 113A-C may represent processes that do not match with a vulnerability during vulnerability mitigation 130. In some embodiments, process 113A may represent a non-vulnerable, non-dependent process, and processes 113B-C may represent processes with a dependent relationship to main process 111, regardless of their vulnerable/non-vulnerable status. Processes 115A-B may represent vulnerable processes with no dependent relationship with main process 111.

Once the source image 110 undergoes vulnerability mitigation 130, source image 110 may be transformed into mitigated image 120, as described herein. The dependencies of the main process may be identified (e.g., processes 113B-C) and left in their original state. Processes (e.g., 113A) with no dependent relationship and no vulnerability may also be left in their original state. However, vulnerable processes with no dependent relationship to the main process 111 (e.g., processes 115A-B) may be removed or otherwise mitigated.

Mitigated image 120 may include an additional mitigation layer 118. In some embodiments, mitigation layer 118 may remove, persistently delete, block, persistently stop, or otherwise mitigate/neutralize the vulnerable processes 115A-B.

According to embodiments, source image 110 and mitigated image 120 are depicted simply, and may exist, in practice, with any number of layers and processes.

Figure 2:
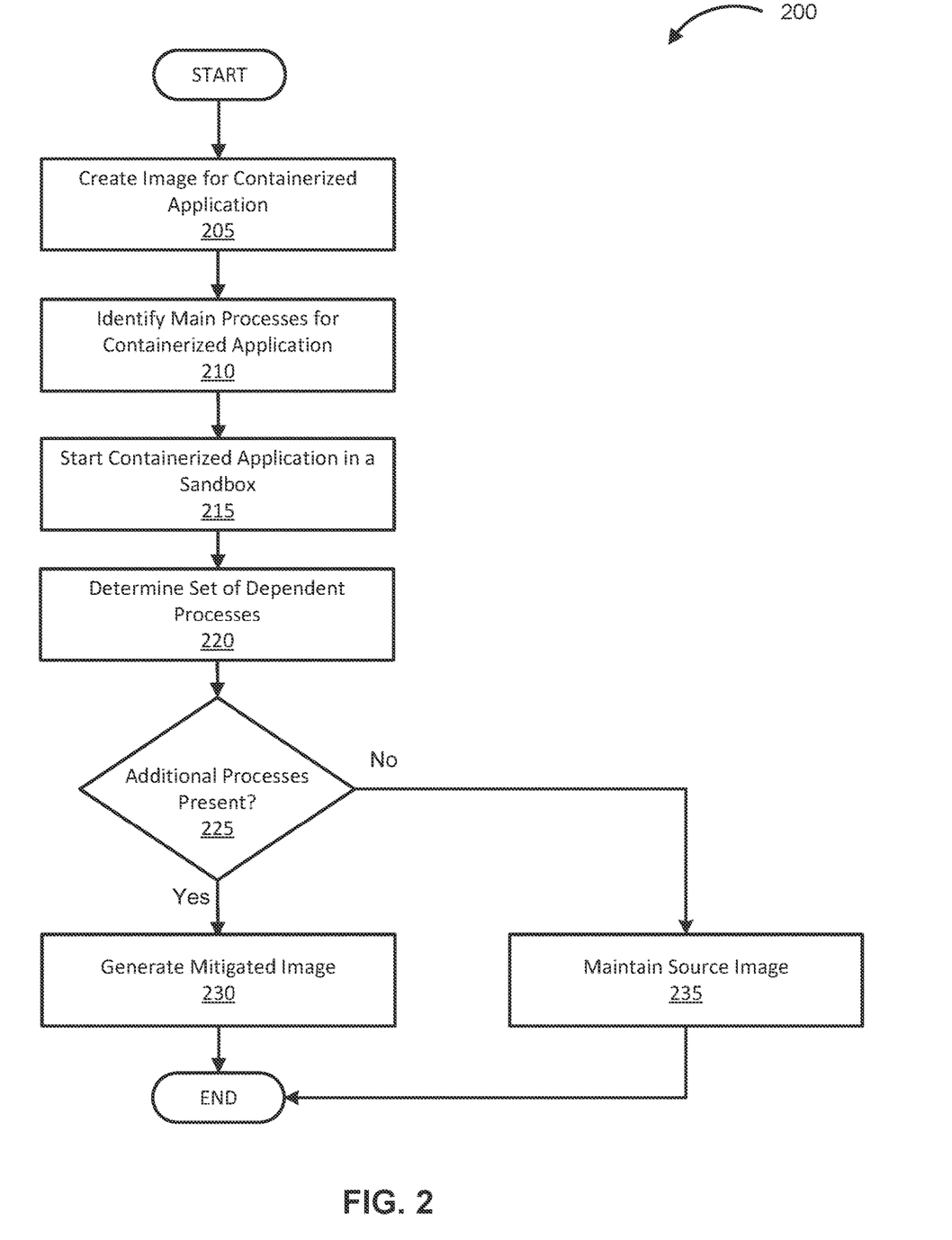
FIG. 2 illustrates an example method for automatic vulnerability mitigation, in accordance with embodiments of the present disclosure.

Referring now to FIG. 2, illustrated is an example method 200 for automatic vulnerability mitigation, in accordance with embodiments of the present disclosure. Method 200 may begin at 205, where an image for a containerized application is created. Creating an image for a containerized application may include generating a number of image layers, such as those depicted in source image 110.

At 210, the main process for the containerized application is identified. As described herein, this may include analyzing the image layers (e.g., to find RUN/CMD/ENTRYPOINT, or the like). This analysis may be performed in a runtime environment, prior to starting the container, or in a sandbox environment, according to embodiments.

At 215, the containerized application is started in a sandbox environment (e.g., a secured, isolated environment for testing, debugging, security vulnerability identification, etc.). This may include, for example, starting a containerized application within an isolated virtual machine that mimics an actual runtime environment.

At 220, a set of dependent processes is identified. According to embodiments, this may include analyzing the operation of the main process to determine which other processes interact with the main process, or which other processes the main process invokes or otherwise requires to run a stable manner.

At 225, it is determined if there are additional processes present. If, at 225, no additional processes are present, the source image may be maintained at 235. This may include, for example, preserving the source image for implementation going forward, according to embodiments.

If, however, additional processes are determined to be present at 225, a mitigated image may be generated at 230. Generating a mitigated image may include, for example, identifying vulnerable and non-dependent (e.g. processes the main process does not depend upon) and incorporating mitigation measures into a mitigation layer within a mitigated image, such as mitigated image 120, according to embodiments. The mitigated image may, according to embodiments, be used going forward to mitigate any security and/or stability vulnerabilities that may have been present in the source image. Additional detail regarding the generation of a mitigated image is given with respect to FIG. 3.

Figure 3:
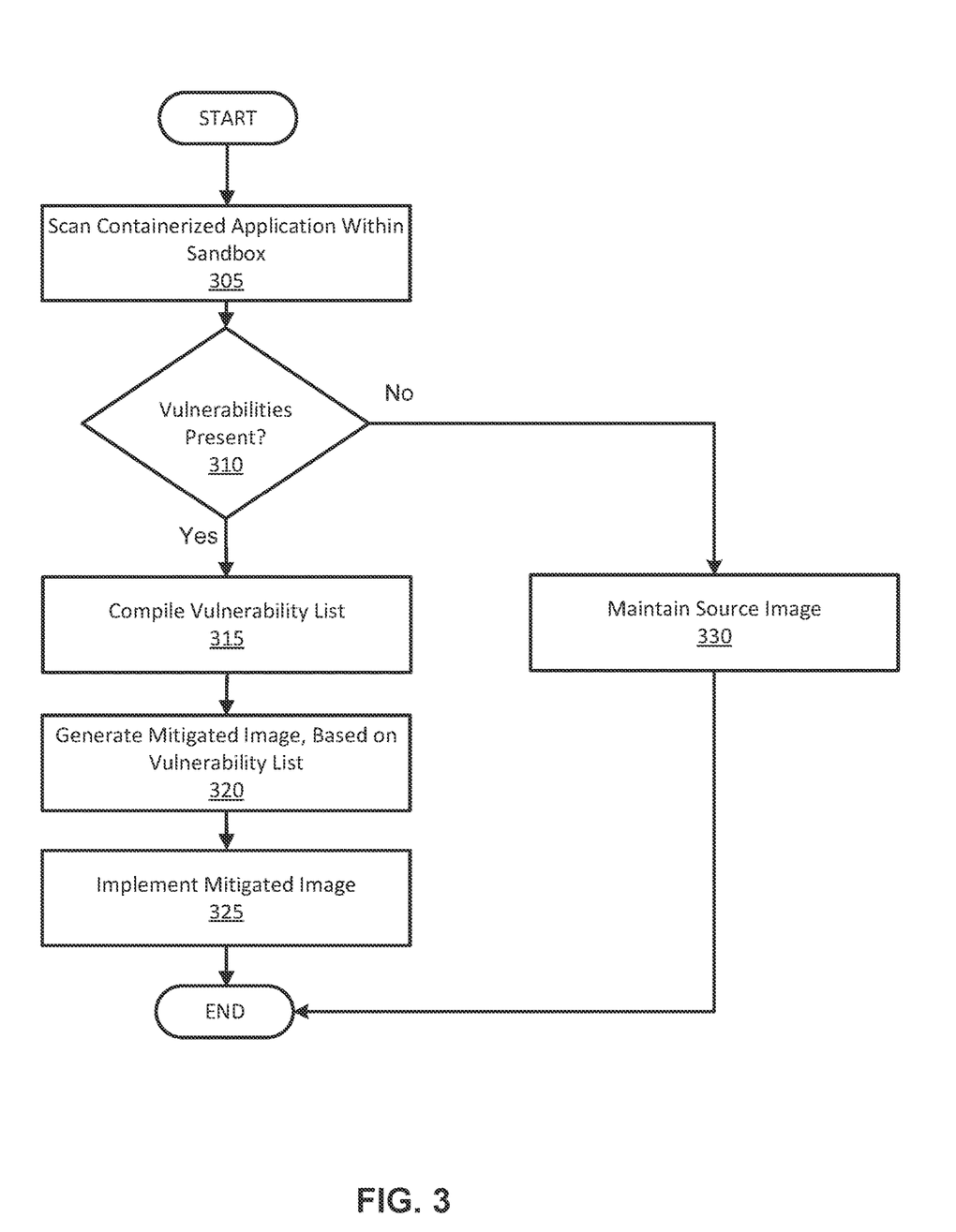
FIG. 3 illustrates an example method for generating a mitigated image, in accordance with embodiments of the present disclosure.

Referring now to FIG. 3, illustrated is an example method 300 for generating a mitigated image, in accordance with embodiments of the present disclosure. Example method 300 may being at 305, where a containerized application is scanned within a sandbox environment. Method 300 assumes that process dependencies have already been determined (e.g., at 220).

At 310, it is determined whether any vulnerabilities may be present in the containerized application, or within the image from which the containerized application is generated. This may be performed using a security scanner, as described herein.

If, at 310, no vulnerabilities are found, the source image may be maintained at 330 and used for implementation in a cloud computing environment, or any other suitable computing environment.

If, however, vulnerabilities are detected at 310, a vulnerability list may be compiled at 315, as described herein. This may include, for example, a list of processes for which more secure versions exist.

At 320, a mitigated image is generated, based on the vulnerability list. As depicted in mitigated image 120, a mitigated image may remove, delete, block, or otherwise mitigate any process that is both 1) on the vulnerability list and 2) has no dependent relationship with the main process of the containerized application.

At 325, the mitigated image may be implemented. For example, this may include deployment on a DOCKER or KUBERNETES platform within a cloud environment, according to embodiments.

In some embodiments, an administrator, developer, or other user may be notified of the mitigated image. This may include, for example, a report detailing whether all vulnerabilities were able to be mitigated, as well as whether any vulnerabilities were present in dependent processes, or the main process, that could not be mitigated automatically. In some embodiments, this may occur prior to implementation of the mitigated image at 325, and the implementation of the mitigated image may, according to embodiments, be delayed until any remaining vulnerabilities are addressed/mitigated.

It is to be understood that although this disclosure includes a detailed description on cloud computing, implementation of the teachings recited herein are not limited to a cloud computing environment. Rather, some embodiments of the present invention are capable of being implemented in conjunction with any other type of computing environment now known or later developed.

Cloud computing is a model of service deliver for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
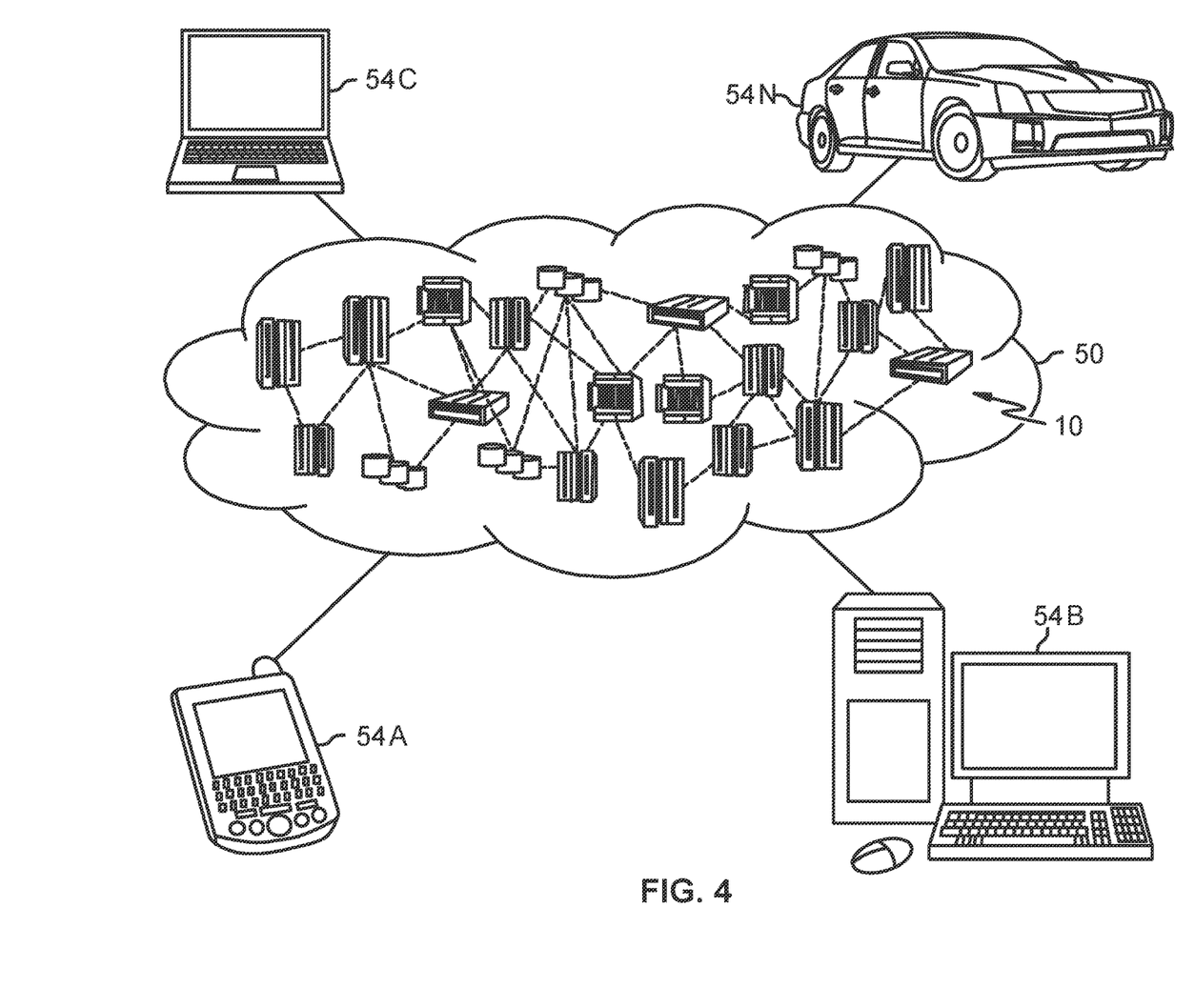
FIG. 4 depicts a cloud computing environment according to an embodiment of the present disclosure.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
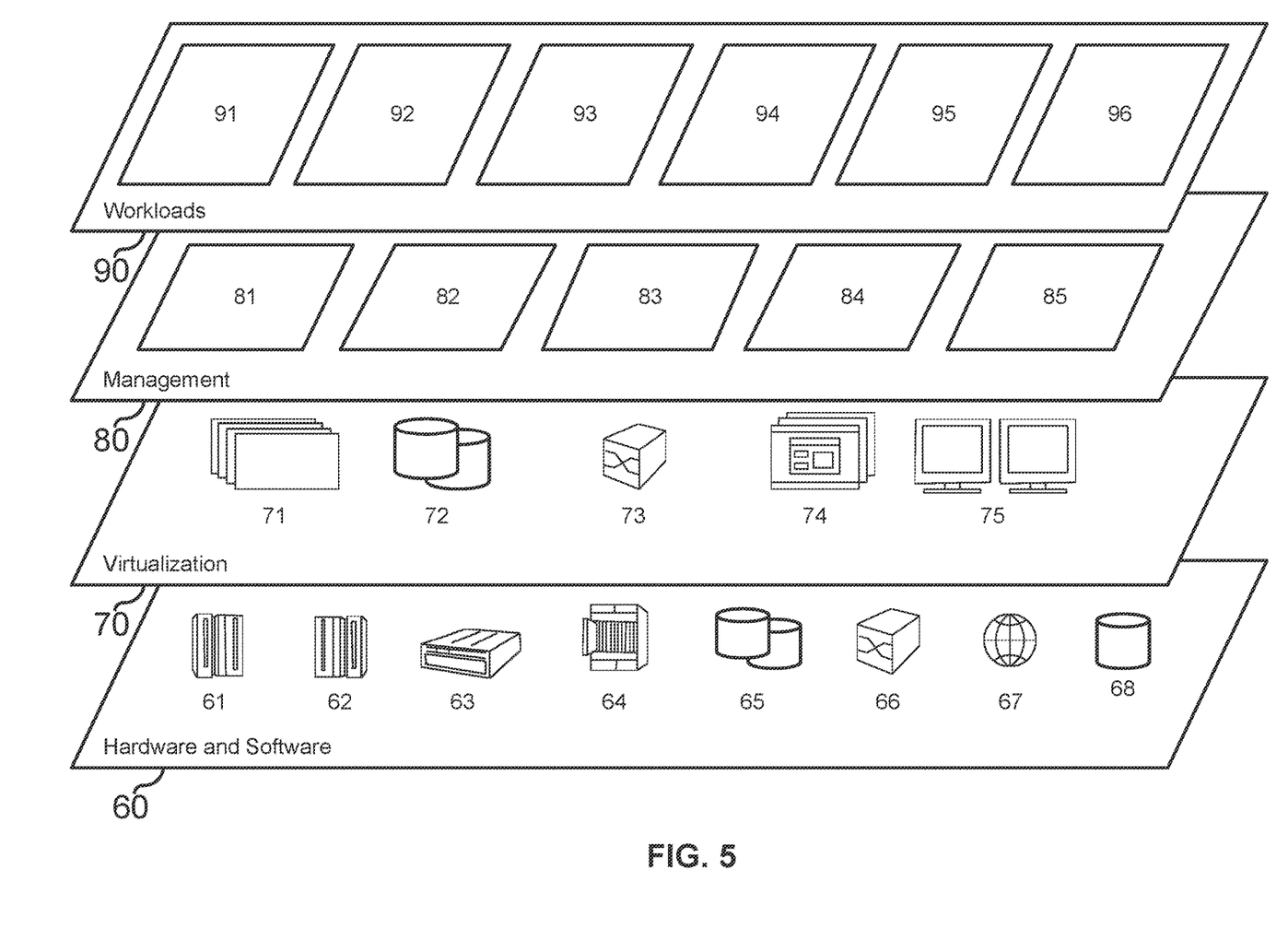
FIG. 5 depicts abstraction model layers according to an embodiment of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and some embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and containerized application vulnerability mitigation 96.

Figure 6:
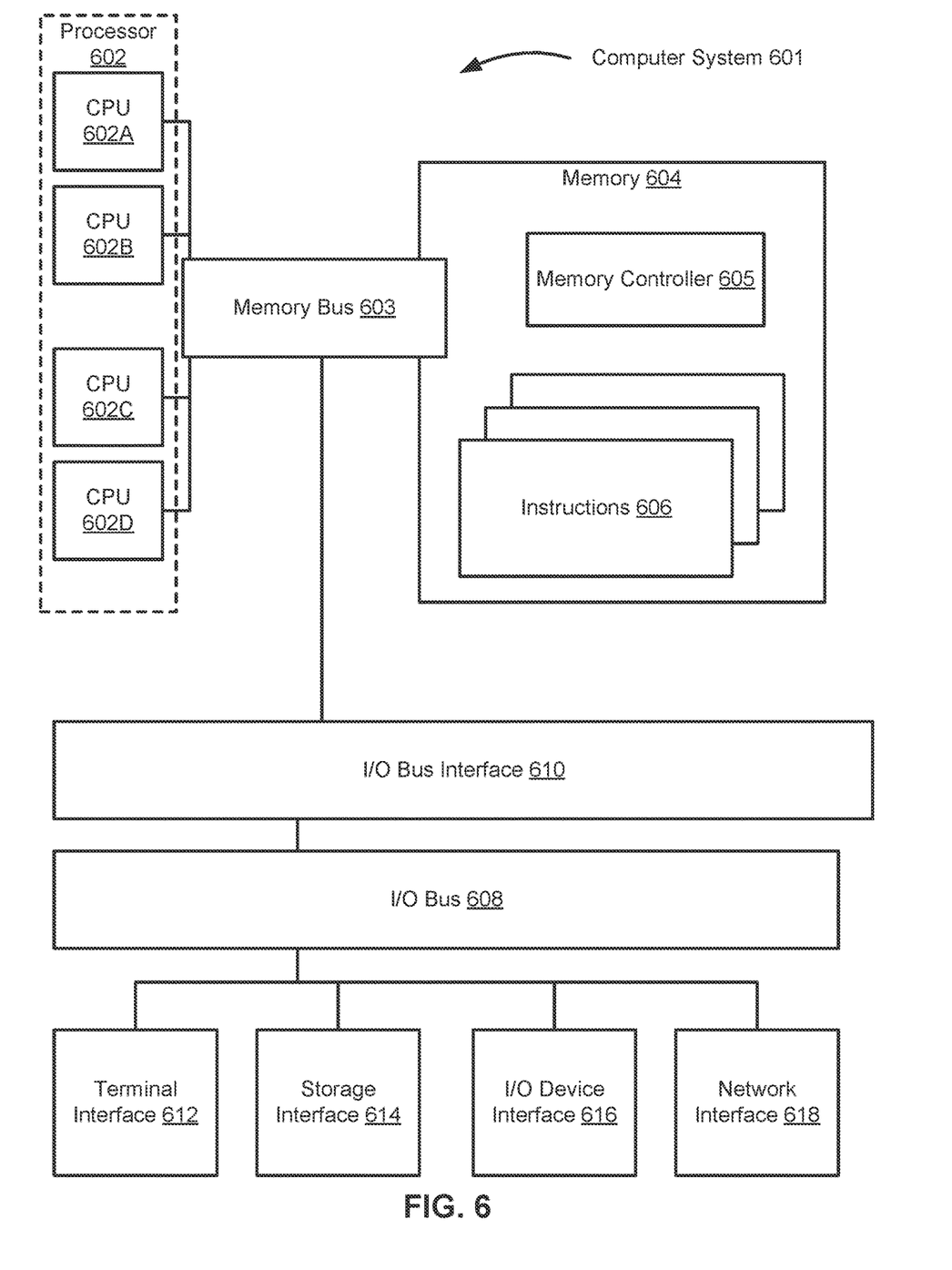
FIG. 6 depicts a high-level block diagram of an example computer system that may be used in implementing embodiments of the present disclosure.

Referring now to FIG. 6, shown is a high-level block diagram of an example computer system 601 that may be configured to perform various aspects of the present disclosure, including, for example, methods 200/300, described in FIGS. 2/3. The example computer system 601 may be used in implementing one or more of the methods or modules, and any related functions or operations, described herein (e.g., using one or more processor circuits or computer processors of the computer), in accordance with embodiments of the present disclosure. In some embodiments, the illustrative components of the computer system 601 comprise one or more CPUs 602, a memory subsystem 604, a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may comprise one or more levels of on-board cache. Memory subsystem 604 may include instructions 606 which, when executed by processor 602, cause processor 602 to perform some or all of the functionality described above with respect to FIGS. 2/3.

In some embodiments, the memory subsystem 604 may comprise a random-access semiconductor memory, storage device, or storage medium (either volatile or non-volatile) for storing data and programs. In some embodiments, the memory subsystem 604 may represent the entire virtual memory of the computer system 601 and may also include the virtual memory of other computer systems coupled to the computer system 601 or connected via a network. The memory subsystem 604 may be conceptually a single monolithic entity, but, in some embodiments, the memory subsystem 604 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 604 may contain elements for control and flow of memory used by the CPU 602. This may include a memory controller 605.

Although the memory bus 603 is shown in FIG. 6 as a single bus structure providing a direct communication path among the CPUs 602, the memory subsystem 604, and the I/O bus interface 610, the memory bus 603 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, mobile device, or any other appropriate type of electronic device.

It is noted that FIG. 6 is intended to depict the representative example components of an exemplary computer system 601. In some embodiments, however, individual components may have greater or lesser complexity than as represented in FIG. 6, components other than or in addition to those shown in FIG. 6 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatic vulnerability mitigation, comprising:
   creating an image for a containerized application;
   identifying, from the image, one or more main processes of the containerized application, the one or more main processes comprising a first subset of a plurality of processes of the containerized application;
   starting, within a sandbox environment, the containerized application;
   determining, based on the started containerized application within the sandbox environment, a second subset of processes within the plurality, the second subset including one or more dependent processes associated with and dependent on the one or more main processes comprising the first subset;
   determining a third subset of non-dependent processes within the plurality, the third subset excluding the first and second subsets and being associated with a vulnerability list, the vulnerability list being a pre-defined list of vulnerable processes determined by a security scanner; and
   generating, according to the third subset, a mitigated image for the containerized application.

2. The method of claim 1, wherein generating the mitigated image further comprises adding a new application layer to the containerized application, the new application layer including a persistent deletion command for the third subset of processes.

3. The method of claim 1, wherein generating the mitigated image further comprises replacing one or more processes within the third subset with a secured version of the one or more processes.

4. The method of claim 1, wherein generating the mitigated image further comprises persistently halting the third subset.

5. The method of claim 1, wherein software is provided as a service to generate the mitigated image.

6. A computer program product for automatic vulnerability mitigation, the computer program product comprising a computer readable storage medium having program instructions embodied therewith, the program instructions executable by a device to cause the device to:
   create an image for a containerized application;
   identify, from the image, one or more main processes of the containerized application, the one or more main processes comprising a first subset of a plurality of processes of the containerized application;
   start, within a sandbox environment, the containerized application;
   determine, based on the started containerized application within the sandbox environment, a second subset of processes within the plurality, the second subset including one or more dependent processes associated with and dependent on the one or more main processes comprising the first subset;
   determine a third subset of non-dependent processes within the plurality, the third subset excluding the first and second subsets and being associated with a vulnerability list, the vulnerability list being a pre-defined list of vulnerable processes determined by a security scanner; and
   generate, according to the third subset, a mitigated image for the containerized application.

7. The computer program product of claim 6, wherein generating the mitigated image further comprises adding a new application layer to the containerized application, the new application layer including a persistent deletion command for the third subset of processes.

8. The computer program product of claim 6, wherein generating the mitigated image further comprises replacing one or more processes within the third subset with a secured version of the one or more processes.

9. The computer program product of claim 6, wherein generating the mitigated image further comprises persistently halting the third subset.

10. The computer program product of claim 6, wherein software is provided as a service to generate the mitigated image.

11. A system for automatic vulnerability mitigation, the system comprising:
- a memory subsystem, with program instructions included thereon; and
- a processor in communication with the memory subsystem, wherein the program instructions cause the processor to:
  - create an image for a containerized application;
  - identify, from the image, one or more main processes of the containerized application, the one or more main processes comprising a first subset of a plurality of processes of the containerized application;
  - start, within a sandbox environment, the containerized application;
  - determine, based on the started containerized application within the sandbox environment, a second subset of processes within the plurality, the second subset including one or more dependent processes associated with and dependent on the one or more main processes comprising the first subset;
  - determine a third subset of non-dependent processes within the plurality, the third subset excluding the first and second subsets and being associated with a vulnerability list, the vulnerability list being a predefined list of vulnerable processes determined by a security scanner; and
  - generate, according to the third subset, a mitigated image for the containerized application.

12. The system of claim 11, wherein generating the mitigated image further comprises adding a new application layer to the containerized application, the new application layer including a persistent deletion command for the third subset of processes.

13. The system of claim 11, wherein generating the mitigated image further comprises replacing one or more processes within the third subset with a secured version of the one or more processes.

14. The system of claim 11, wherein generating the mitigated image further comprises persistently halting the third subset.

* * * * *